United States Patent [19]
Allen

[11] Patent Number: 5,822,269
[45] Date of Patent: Oct. 13, 1998

[54] METHOD FOR SEPARATION OF A PLURALITY OF VIBRATORY SEISMIC ENERGY SOURCE SIGNALS

[75] Inventor: Kenneth Paul Allen, Dallas, Tex.

[73] Assignee: Mobil Oil Corporation, Fairfax, Va.

[21] Appl. No.: 555,657

[22] Filed: Nov. 13, 1995

[51] Int. Cl.$^6$ .................................................... G01V 1/00
[52] U.S. Cl. .............................. 367/41; 367/48; 181/111
[58] Field of Search ............................... 367/41, 48, 189; 181/111, 107

[56] References Cited

U.S. PATENT DOCUMENTS

| | | | |
|---|---|---|---|
| 3,885,225 | 5/1975 | Anstey et al. | 367/41 |
| 4,823,326 | 4/1989 | Ward | 367/41 |
| 4,982,374 | 1/1991 | Edington et al. | 367/48 |

OTHER PUBLICATIONS

Ward et al., "Phase Encoding of Vibroseis Signals for Simultaneous Multisource Acquisition," 60th Ann. SEG Int. Mtg. (San Francisco) ISBN 1–56080–013–5, Sep. 1990.

*Primary Examiner*—Ian J. Lobo
*Attorney, Agent, or Firm*—Malcolm D. Keen

[57] ABSTRACT

A method for separating and pre-processing vibratory source data includes varying the phase of vibratory sources according to two patterns. A first pattern is used for odd numbered sources while a second pattern is used for even numbered sources. Each pattern begins with a zero phase shift, the zero phase shift occurring at the sweep number corresponding to the position number of the source. The first pattern is one of zero phase shift, ninety degree phase shift, ninety degree phase shift and one hundred eighty degree phase shift. The second pattern is one of zero phase shift, one hundred eighty degree phase shift, ninety degree phase shift and ninety degree phase shift. The patterns are alternated for each source, the beginning of the pattern corresponds to the position of the source in a line. The first source begins with the first pattern. The second source begins with the second pattern, with zero starting at the second sweep. The third source begins with the first pattern, with zero occurring at the third sweep. The fourth source follows the second pattern, with zero being at the fourth sweep.

7 Claims, 1 Drawing Sheet

METHOD FOR SEPARATION OF A PLURALITY OF VIBRATORY SEISMIC ENERGY SOURCE SIGNALS

BACKGROUND OF THE INVENTION

1. Field of the Invention

The present invention pertains to seismic data processing and more particularly to the generation and pre-processing of seismic data in which data generated by a plurality of vibratory seismic sources is received and prepared for further data processing.

2. Related Prior Art

It is conventional practice to use vibratory sources to apply a force to the ground and measure the subsequent motion caused by the application of this force at various receiver locations. In the interest of economy, several sources are used simultaneously. By controlling the duration and frequency of the force a broad band signal with sufficient energy is achieved. By using the receiver motions and assumed force application, a seismogram is constructed from which properties of the impedance function of the earth can be calculated. In order to construct a seismogram with increased accuracy, a determination of which source was responsible for the detected motions of the receivers must be accomplished.

The construction of a seismogram is typically done by correlation with an estimate of the applied force. Each source has unique characteristics that aids in isolating the source that generated the force which caused the receiver motions, since the data received will vary for each source. Processing with the estimate of one source on data generated by another source will produce an inaccurate seismogram. In order to increase the accuracy in producing a seismogram, the data must be separated according to its generating source for further processing with the force from its corresponding source.

In prior art conventional simultaneous recording requires that a coded series of sweeps be broadcast so that N records are taken with the N vibrators in such a way that separation can be achieved. There are many schemes for encoding the various sweeps etc. Most of these have been tried and published. Examples of prior art methods of separating source signals are contained in the following patents.

U.S. Pat. No. 4,545,039, titled "Methods For Seismic Exploration", issued to Carl H. Savit, discloses a method whereby characteristic sweeps of seismic signals are transmitted through the medium being explored, such as an earth formation, to receptors, such as geophones or hydrophones. These sweeps consist of pulse trains having a predetermined number of pulses in which the periods or durations of the pulses are randomized, Also, the wave shape and relative time displacements of the pulses in different trains provide substantially constant spectral level over a frequency range containing several octaves. This is purportedly achieved even though the durations of the pulses correspond to a frequency range not exceeding an octave during the sweep. Groups of signals contained in less than the entire length of the sweep which are transmitted and which are received can be cross correlated to vary the effective duration of the sweep. The cross correlation output of successively occurring sweeps may be stacked to reduce the side lobe amplitude of the cross correlation outputs from each sweep, from which outputs seismograms may be constructed.

U.S. Pat. No. 4,675,851, titled "Method For Seismic Exploration", issued to Carl H. Savit and Mark R. Doyle, discloses a method for the transmission of signals whereby sweeps of seismic signals change in duration. These sweeps consist of pulse trains having a predetermined number of pulses in which the periods or durations of the pulses are randomized and in which the wave shape and relative time displacements of the pulses in different trains provide substantially constant spectral level over a frequency range containing several octaves.

U.S. Pat. No. 4,707,812 titled "Method For Suppressing vibration Seismic Signal Correlation Noise", issued to David R. Martinez, discloses a method of seismic prospecting in which there is employed conventional upsweep and downsweep and opposed polarity of signals that are being sent into the earth as seismic signals. In this method there is introduced a taper at the common frequency at the common time on the respective upsweep and downsweep signals to reduce the most significant part of the correlation noise. This is done while attempting to provide the advantages of each of the methods of using opposite phase polarity to cancel partially and opposite upsweep and downsweep to reduce the amplitude of the noise experienced, as well as the reduction of a significant part of the correlation noise that distorts the desired zero-phase Klauder wavelet.

U.S. Pat. No. 4,715,0202 titled "Simultaneous Performance Of Multiple Seismic Vibratory Surveys", issued to Ralph A. Landrum, Jr., relates to a method of performing a plurality of vibratory seismic surveys simultaneously. Several vibratory sources transmit signals into the earth. Each source successively transmits the same signal, except that an offset phase of the signal is selectively shifted for successive transmissions. The offset phase of the signal transmitted by each vibratory source is selected to enable the signal from each of the vibratory sources to be recovered by data processing.

SUMMARY OF THE INVENTION

The present invention provides a method for generating, recording and pre-processing high resolution vibratory source data which includes separation of the data. In the present invention, the phase of each of a plurality of vibrators is shifted for consecutive sweeps, according to one of two patterns. The first pattern is one of zero phase shift, ninety degree phase shift, ninety degree phase shift and one hundred eighty degree phase shift. The second pattern is one of zero phase shift, one hundred eighty degree phase shift, ninety degree phase shift and ninety degree phase shift. The patterns are alternated for each source, the beginning of the pattern corresponds to the position of the source in a line. The first source begins with the first pattern. The second source begins with the second pattern, with zero starting at the second sweep. The third source begins with the first pattern, with zero occurring at the third sweep. The fourth source follows the second pattern, with zero being at the fourth sweep. In other words, the patterns alternate with the zero beginning occurring at the sweep number or multiple of the sweep number corresponding to the source number.

BRIEF DESCRIPTION OF THE DRAWINGS

The attached FIGURE is a diagram illustrating a multi source system for generating seismic signals.

DESCRIPTION OF THE PREFERRED EMBODIMENT

Figure 1:
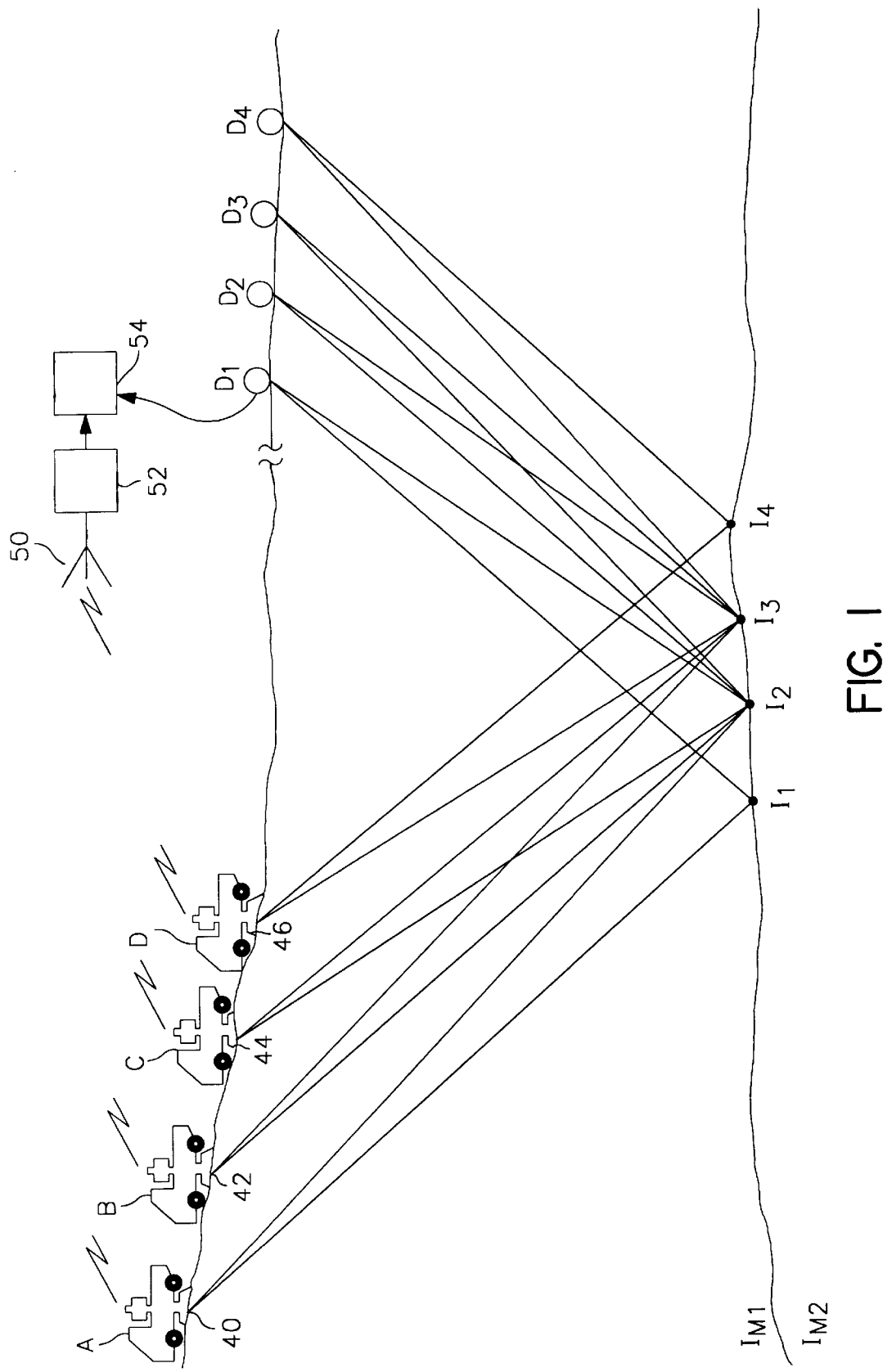

In practicing the present invention a simple vibrator similar to those used throughout the industry for a vibratory source may be employed. The force is applied by reversing hydraulic flow in a chamber in the reaction mass suspended by a piston and rod attached to a stilt structure on the vibratory truck.

Typically, the reaction mass motion is measured by accelerometers mounted on the reaction mass itself. The motion of a baseplate is measured by accelerometers mounted on the stilt structure cross member. In the present invention, pairs of accelerometers are used so that their outputs may be compared and a determination may be made whether the signal generated is suitable for use in further processing.

The attached FIGURE is a system diagram illustrating the seismic energy generation and data gathering process of the present invention. Vibrator trucks A, B, C and D have vibrators pairs of with accelerometers 40, 42, 44 and 46, respectively, that measure a vibrator signal that is related to that which is generated into the earth by each of the trucks. The signals are then transmitted via radio link 50 to master vibrator memory 52 where they are checked to determine their reliability and are stored for comparison at a later time. The measured signals are also transmitted to summing block 54 where they are combined for recording and storage for future use.

The signals from summing block 54 are transmitted to a recorder for transfer to a tape or other recording medium for combination with raw seismic data received from detectors $D_1, D_2, D_3 \ldots D_n$. A determination may be made whether the recorded motions can be decompressed or separated. If not, a command may be sent out to repeat acquisition.

If the data can be separated, it is stored in a recorder memory, for separation. In the memory, the data is separated into various sets for further processing. The sets are those generated by each vibrator truck A, B, C, and D. One set corresponds to the data attributable to the seismic waves generated by truck A, a second set corresponds to the data attributable to the seismic waves generated by truck B, etc.. This separation is done so that the correct data can be divided by the frequency signal coinciding to the truck which generated this data.

To insure proper separation of received data, care must first be taken in the generation and transmission of the seismic energy or acoustic waves Through control of the generation of the seismic energy, an ability to accurately separate the data received by detectors $D_1, D_2, D_3 \ldots D_n$ is achieved. Thus, the data received by the detectors can be separated as that generated by truck A, that generated by truck B, that generated by truck C and that generated by truck D. The spacing between the trucks can have a significant effect in migrating the data, translating travel time into distance.

The following illustrates the preferred embodiment of the present invention wherein a phase sequence is employed to separate the simultaneously acquired sweeps.

|  | SWEEP # | | | |
| --- | --- | --- | --- | --- |
|  | 1 | 2 | 3 | 4 |
| VIBRATOR A (phase) | 0 | 90 | 90 | 180 |
| VIBRATOR B (phase) | 90 | 0 | 180 | 90 |
| VIBRATOR C (phase) | 90 | 180 | 0 | 90 |
| VIBRATOR D (phase) | 180 | 90 | 90 | 0 |

As illustrated, four vibratory sources are used for four sweeps, a first source, vibrator A, following said first pattern, with zero occurring at the first sweep, a second source, vibrator B, following said second pattern, with zero occurring at the second sweep, a third source, vibrator C, following said first pattern, with zero occurring at the third sweep and a fourth source, vibrator D, following said second pattern, with zero occurring at the fourth sweep.

For this method the necessary processing signals can be encoded and the individual vibrator motions can be extracted. This means that only one signal needs to be telemetered to the recorder for each sweep sequence.

As described, the present invention provides a method for separating and pre-processing vibratory source data which includes varying the phase of vibratory sources according to two patterns. A first pattern is used for odd numbered sources while a second pattern is used for even numbered sources. Each pattern begins with a zero phase shift, the zero phase shift occurring at the sweep number corresponding to the position number of the source. The first pattern is one of zero phase shift, a first ninety degree phase shift, followed by a second ninety degree phase shift and finally a one hundred eighty degree phase shift. The second pattern is one of a zero phase shift, a one hundred eighty degree phase shift, a first ninety degree phase shift and finally, a second ninety degree phase shift. When four vibratory sources are used for four sweeps, the phase shift for the vibratory sources are as follows. The first source follows the first pattern, with zero phase shift occurring at the first sweep. The second source follows the second pattern, with the zero phase shift occurring at the second sweep. The third source follows the first pattern, with zero phase shift occurring at the third sweep. The fourth source follows the second pattern, with the zero phase shift occurring at the fourth sweep.

When four vibratory sources are used, the first sweep has the following phase shifts for each of the vibratory sources. The first vibratory source begins with the zero phase shift of the first pattern. The second vibratory source begins with the second ninety degree phase shift of the second pattern. The third vibratory source begins with the second ninety degree phase shift of the first pattern. The fourth vibratory source begins with the one hundred eighty degree phase shift of the second pattern.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

I claim:

1. A method for separating vibratory source data comprising the steps of:

generating seismic energy having a different phase for each of the vibratory sources by varying the phase of vibratory sources for each sweep according to a first pattern for odd numbered sources and a second pattern for even numbered sources, each pattern beginning with a zero phase shift, the zero phase shift occurring at the sweep number corresponding to the position number of the source;

detecting-said seismic energy after said seismic energy has been reflected by a subsurface interface; and identifying said detected reflected seismic energy according to its phase characteristic for each sweep.

2. The method for separating vibratory source data according to claim 1 wherein step of generating seismic energy includes the steps of:

providing said first pattern of zero phase shift, ninety degree phase shift, ninety degree phase shift and one hundred eighty degree phase shift; and providing said second pattern of zero phase shift, one hundred eighty degree phase shift, ninety degree phase shift and ninety degree phase shift.

3. The method for separating vibratory source data according to claim 1 wherein said identifying step also includes the steps of:

determining whether said detected reflected seismic energy can be separated for each sweep; and issuing a command to repeat acquisition when said detected reflected data cannot be separated.

4. A method for producing seismic reflection data from a plurality of vibratory source comprising the steps of:

generating seismic energy into the earth by shifting the phase of each of a plurality of vibratory sources for consecutive sweeps, according to one of two patterns, said patterns including a first pattern and a second pattern, said step of generating seismic energy into the earth including:

providing said first pattern of zero phase shift, ninety degree phase shift, ninety degree phase shift and one hundred degree phase shift; and providing said second pattern of zero phase shift, one hundred eighty degree phase shift, ninety degree phase shift and ninety degree phase shift;

energizing four vibratory sources for four sweeps, a first source following said first pattern, with said zero phase shift occurring at the first sweep, a second source following said second pattern, with said zero phase shift occurring at the second sweep, a third source following said first pattern, with said zero phase shift occurring at the third sweep and a fourth source following said second pattern, with said zero phase shift occurring at the fourth sweep;

detecting said seismic energy that has been reflected by a subsurface interface; and separating said detected seismic energy according to each of said vibratory sources.

5. A method for generating seismic data from a plurality of vibratory sources comprising the steps of:

shifting the phase of each of a plurality of vibratory sources for consecutive sweeps, according to one of two patterns, said first pattern having a zero phase shift, a first ninety degree phase shift, a second ninety degree phase shift and a one hundred eighty degree phase shift for four consecutive sweeps and said second pattern having a zero phase shift, a one hundred eighty degree phase shift, a first ninety degree phase shift and a second ninety degree phase shift for four consecutive sweeps; and alternating the patterns for each source, with the beginning of the pattern corresponding to the position of the source in a line.

6. The method for generating seismic data from a plurality of vibratory sources according to claim 5 also including the steps of:

providing four vibratory sources, a first vibratory source beginning with said zero phase shift of said first pattern on said first sweep, a second vibratory source beginning with said one hundred eighty degree phase shift of said second pattern on said first sweep, a third vibratory source beginning with said second ninety degree phase shift of said first pattern on said first sweep and a fourth vibratory source beginning with said second ninety degree phase shift of said second pattern on said first sweep.

7. A method for producing seismic reflection data from a plurality of vibratory sources comprising the steps of:

generating seismic energy into the earth by shifting the phase of each of a plurality of vibratory sources for consecutive sweeps, according to one of two patterns by providing a first pattern of zero phase shift, ninety degree phase shift, ninety degree phase shift and one hundred eighty degree phase shift and a second pattern of zero phase shift, one hundred eighty degree phase shift, ninety degree phase shift and ninety degree phase shift;

alternating the patterns for each source, with the beginning of the pattern corresponding to the position of the source in a line by energizing four vibratory sources for four sweeps, a first source following said first pattern, with said zero phase shift occurring at the first sweep, a second source following said second pattern, with said zero phase shift occurring at the second sweep, a third source following said first pattern, with said zero phase shift occurring at the third sweep and a fourth source following said second pattern, with said zero phase shift occurring at the fourth sweep;

detecting said seismic energy that has been reflected by a subsurface interface;

determining whether said detected seismic energy can be separated for each sweep;

issuing a command to repeat said generating seismic energy step when said detected seismic energy cannot be separated; and separating said detected seismic energy according to each of said vibratory sources when said seismic energy can be separated.

* * * * *